(12) United States Patent
Noble et al.

(10) Patent No.: US 8,339,282 B2
(45) Date of Patent: Dec. 25, 2012

(54) SECURITY SYSTEMS

(76) Inventors: Lawson John Noble, Welwyn Garden City (GB); Nico Bekooy, Welwyn Garden City (GB); Frank James Thomson, Welwyn Garden City (GB)

( * ) Notice: Subject to any disclaimer, the term of this patent is extended or adjusted under 35 U.S.C. 154(b) by 312 days.

(21) Appl. No.: 12/775,835

(22) Filed: May 7, 2010

(65) Prior Publication Data

US 2011/0057816 A1  Mar. 10, 2011

(30) Foreign Application Priority Data

May 8, 2009  (GB) .................................. 0907937.7
Oct. 27, 2009  (GB) .................................. 0918766.7

(51) Int. Cl.
*G08G 1/017* (2006.01)
*G06K 9/00* (2006.01)

(52) U.S. Cl. ..... 340/937; 340/903; 340/435; 340/425.5; 382/103; 382/104; 382/105; 348/135; 348/148

(58) Field of Classification Search .................. 340/937, 340/903, 435; 382/105
See application file for complete search history.

(56) References Cited

U.S. PATENT DOCUMENTS

| | | | | |
|---|---|---|---|---|
| 5,948,038 | A * | 9/1999 | Daly et al. | 701/117 |
| 6,507,670 | B1 * | 1/2003 | Moed | 382/172 |
| 7,266,221 | B2 * | 9/2007 | Shima et al. | 382/106 |
| 2005/0069173 | A1 * | 3/2005 | Morisada et al. | 382/103 |

* cited by examiner

*Primary Examiner* — Donnie Crosland
(74) *Attorney, Agent, or Firm* — Jon M. Gibbs; Lowndes, Drosdick, Doster Kantor & Reed, P.A.

(57) ABSTRACT

A vehicle detection system for detecting the presence of at least part of a vehicle in image data, the system comprising: an interface configured to receive image data; an identifier module configured to identify a plurality of linear regions in an image represented by the image data; a comparator configured to compare at least one of the number, cumulative size, and density of the linear regions with a respective threshold value; and an output configured to issue a signal indicating the detection of a vehicle based on the results of the comparison.

17 Claims, 9 Drawing Sheets

L590JKL

Figure 2

SECURITY SYSTEMS

CLAIM OF PRIORITY

This application claims priority to GB Patent Application GB 0907937.7, filed May 8, 2009, and GB Patent Application GB 0918766.7 filed Oct. 27, 2009.

FIELD OF THE INVENTION

Embodiments of the present invention and described aspects relate to an automatic number plate recognition system, a pre-processor, a method of processing image data, a vehicle detection system, a computer implemented method for detecting the presence of at least part of a vehicle, a vehicle movement detection system, a computer implemented method for detecting the movement of a vehicle, a vehicle type detection system, a computer implemented method for detecting the type of a vehicle, a tracking and identity association system, a tracking and identity association method, a vehicle colour sample location identification system, a computer implemented method for vehicle colour sample location identification, a vehicle colour sample system, and a computer implemented method for vehicle colour sampling.

Automatic number plate recognition systems (ANPR systems)—also known as automatic licence plate recognition systems (ALPR systems)—have been in use for a number of years. The increased security threat created by escalating terrorist activities around the world has (along with other factors) created a need for more advanced ANPR systems with a higher degree of accuracy.

Traditional ANPR systems comprise the general components depicted in FIG. 1. With reference to FIG. 1, a traditional ANPR system comprises a camera mounted in a position such that number plates (also known as licence plates) from passing vehicles are within its field of view. Normally, such cameras are mounted on elevated platforms such as poles or the underside of bridges. Often the cameras include infra-red cameras.

Typically, each camera outputs an analogue video signal through a communications line to a local computer (which may receive input signals from a single camera or from multiple cameras). The local computer is housed in a station located close to the camera; for example, along the side of the road next to the camera. Air conditioning units are used to ensure that the station does not overheat during operation of the computer installed therein (multiple computers are likely to be stored in the same station and, therefore, excessive heat can be a serious problem).

The local computer captures one or more "still" images from an analogue video signal of the camera to which it is connected (often the still images are captured several times every second). Each image is analysed by the local computer to determine whether or not a number plate is present within the still image. When a number plate is detected, the area representing the number plate is isolated and optical character recognition (OCR) techniques are utilised to obtain a text string representing the registration number on the number plate (an example number plate with registration number is shown in FIG. 2). This process is carried out entirely within the local computer. The local computer may be connected to a local storage facility to log the results of the number plate recognition process.

Normally, the local computer is connected to a communications network which can take the form of an optical fibre communications line. The communications network is connected to a law enforcement station or computer which receives a text string containing each recorded registration number. In addition, the communications network may be operable to communicate a copy of the original still images used to capture the registration number (i.e. the still images captured from the analogue video signal) from the local computer to the law enforcement station. As will be appreciated, at this stage the images are in a digital format and not the original analogue format which was received from the camera by the local computer.

The law enforcement station or computer is connected to one or more databases containing lists of registration numbers of interest (herein referred to as search databases) and a storage facility to record all of the information received from the local computers through the communications network.

When a registration number is received through the communications network from a local computer and the law enforcement station attempts to locate that number in one of the search databases; should the number be located the event is logged by the station and local law enforcement authorities may be informed of the event.

Traditional ANPR systems have been adapted for use with digital cameras with a similar structural arrangement to that shown in FIG. 1.

The infrastructure required to operate a traditional ANPR system is significant. In addition to the installation of the cameras themselves, it is also necessary to provide storage facilities for the local computers. These storage facilities are generally air conditioned to ensure proper operation of the local computers even in comparatively hot weather (as previously mentioned).

In addition, due to the exposed locations in which these systems are located and the threat of vandalism, it is often necessary to secure all of the equipment in reinforced housings to ensure that it is not susceptible to damage.

Furthermore, large optical fibre networks need to be installed along the length of the road connecting each of the local computers to the law enforcement station or computer. At present, installation of the optical fibre network alone can cost more than £1,000 for every meter of optical fibre cable laid next to a road. Thus, even over relatively short distances, the infrastructural costs associated with the installation of a camera network for ANPR systems are considerable.

In recent years there has been pressure placed upon companies which produce ANPR systems to design a fully integrated local computer and camera. Thus, the camera and local computer are stored in a single housing which may be mounted on, for example, a pole or the underside of a bridge. The camera is oriented such that vehicles passing along the road in question pass through the field of view of the camera and images of the vehicles may be captured in the normal manner. The local computer (which is housed in the same housing as the camera) isolates the location of any number plates in the captured images and carries out the required OCR process to determine the registration number. This reduces the need for a station along the side of the road to house the local computers.

In some instances, the local computer (now stored in the same housing as the camera) is connected to the same type of communications networks (e.g. an optical fibre network) as the traditional systems—as described above. However, the local computer may simply output a text string containing the recognised registration numbers which can be communicated over a wireless communication system such as GPRS (because only a relatively low bandwidth is required to communicate this information).

Cameras and local computers mounted in the same housing form a relatively large object. The footprint of the housing must be sufficient to contain the camera and computer components. For example, the housing must be sufficient to contain a video camera and a micro-ATX motherboard for the computer (along with the space required for a processor) and any associated controllers (such as PCI graphics cards).

The size of the integrated camera and local computer housings means that special steps must be taken in order to ensure that the housings are securely attached to the pole or other structure by which they are supported. Furthermore, the excessive size means that the integrated cameras and local computers are no longer viable options for placement in certain positions where there is limited space or where concealment of the camera is important.

Recently, high definition digital cameras have become available. High definition digital images are similar to standard digital images; however, the high definition images contain a considerably higher density of image pixels when compared with standard digital images. Thus, an ANPR system utilising a high definition digital camera must use a local computer which is capable of processing an extremely large number of pixels in a relatively short period of time in order to identify number plates and carry out the required OCR processes. This time period will be referred to as processing time herein.

In traditional digital camera based systems and the newly proposed high definition digital camera based systems, excessive processing time in the local computer results in a reduced sampling frequency of the output signal from the camera. If the sampling frequency is reduced significantly, then vehicles may pass through the field of view of the camera without a still image of the registration number being captured. Thus, vehicles may go undetected. This is clearly an undesirable result for an ANPR system designed to record the details of every passing vehicle.

The problems associated with high definition digital cameras in ANPR systems, and integrated housings containing both cameras and local computers, become apparent when high definition digital cameras are integrated into a single housing with the local computer. In addition to the previous problems associated with such integrated housings and the processing of high definition digital images, the physical space required to house the local computer is significantly greater because the processing power of the computer must be much larger.

Thus, the adoption of ANPR systems using integrated cameras and local computers is likely to be stifled. In addition, the development of high definition camera based ANPR systems is also likely to be hindered.

The aforementioned problems are also an issue when providing an ANPR system for access control or site monitoring.

Cameras in ANPR systems which may be intended to capture an image of the vehicle (and number plate) when the vehicle reaches a certain point or which are designed to attempt to identify number plates within a certain region of a captured image (for example), can fail if the vehicle is not in a suitable position (relative to the camera) to permit the number plate to be captured sufficiently fully for the registration number to be determined automatically. As such, there is a need for a system which is capable to detecting the presence of a vehicle reliably—as this could be used to increase the chances of at least one image captured by the camera allowing the number plate to be identified therefrom and registration number to be determined. Such systems may detect the motion of a vehicle in a captured image, series of images or parts thereof. Traditional systems are often incapable of determining whether an object within a captured image frame is a vehicle or some other object. As such, conventional systems are not reliable.

A vehicle registration number which is determined using an ANPR system can be checked against a database of vehicles. There is, however, a need to determine further information about the vehicle—for example, the name of the manufacturer, the model, the colour and the identities' of the occupants.

Systems exist which are capable of determining the name of the manufacture and model of a vehicle by comparing captured images of the vehicle with computer models of various vehicles which are stored in a database. The colour of a vehicle is, however, difficult to determine because a single vehicle may comprise components of various different colours—for example a vehicle bumper may be black, the turning indicator lights orange, the vehicle decoration may be red but the main body panel colour may be white. A vehicle colour which is determined by an ANPR system or other security system which is further configured to attempt to determine the colour of the vehicle may not be the main body panel colour. Further problems exist because, for example, such systems may even inadvertently sample the colour of an object neighbouring the vehicle rather than the vehicle itself.

ANPR systems and other security systems may be configured to capture and store or transmit an image of the vehicle. This image may include an image of at least part of one or more vehicle occupants. From these images it is often impossible to determine the identity of the occupants of the vehicle—for example because the images are of poor quality, the images only capture a part of the occupant which is common to many possible vehicle occupants, or the images of part of the vehicle occupant may be distorted or blocked by parts of the vehicle. There is, therefore, a need to be able to determine the occupants of a vehicle or possible occupants of a vehicle.

Embodiments of the present invention seek to ameliorate some of the problems associated with the prior art.

SUMMARY OF THE INVENTION

Accordingly one aspect of the present invention provides a vehicle detection system for detecting the presence of at least part of a vehicle in image data, the system comprising: an interface configured to receive image data; an identifier module configured to identify a plurality of linear regions in an image represented by the image data; a comparator configured to compare at least one of the number, cumulative size, and density of the linear regions with a respective threshold value; and an output configured to issue a signal indicating the detection of a vehicle based on the results of the comparison.

In an embodiment, the system further comprises a camera configured to generate the image data.

In an embodiment, the system further comprises a partition module configured to partition the image data into sections and determine whether each section contains a linear region.

In an embodiment, the system further comprises an analysis module configured to analyse, independently, identified vertical linear regions and horizontal linear regions.

In an embodiment, the analysis module is further configured to locate, based on at least one of the number, cumulative size, and density of identified vertical and horizontal linear regions, at least one of the front and back of a vehicle.

In an embodiment, the system further comprises an automatic number plate recognition system wherein the automatic number plate recognition system is coupled to the output and adapted to be triggered by the signal indicating the detection of a vehicle.

In an embodiment, the comparator is further configured to compare at least one of the cumulative size, number, and density of the identified linear regions with respective predetermined threshold values for each of one or more different types of vehicle; and the output is further configured to issue a signal representative of the type of vehicle detected in dependence on the comparison.

In an embodiment, the system further comprises a tracking module configured to track the movement of at least one of the identified linear regions in a sequence of image data such that movement of the detected vehicle is tracked.

In an embodiment, the system further comprises an antenna configured to receive a signal from a radio communication system including a unique or substantially unique identifier associated with the radio communication system; an identity information source configured to determine information of potential relevance to the identity of a user of the radio communication system; and a database adapted to store information determined by the identity information source in association with the unique or substantially unique identifier received by the antenna.

In an embodiment, the system further comprises a correlation module configured to correlate the information stored in the database to identify patterns in the information.

In an embodiment, the correlation module is configured to analyse information determined by the identity information source in relation to a first unique or substantially unique identifier and to collect the information which is common to a plurality of records for the first unique or substantially unique identifier.

In an embodiment, the correlation module is configured to analyse information determined by the identity information source in relation to a first unique or substantially unique identifier and to compare the information with information collected in relation to a second unique or substantially unique identifier.

In an embodiment, the information of potential relevance to the identity of a user comprises a unique or substantially unique identifier forming part of a signal from another radio communication system.

In an embodiment the system further comprises: a database containing information representative of the external appearance of one or more vehicles including the location of one or more body panels of the or each vehicle; a processor configured to compare at least part of the image data with information stored in the database to determine the identity of a vehicle represented in the image data, and determine one or more colour sample locations in the image data associated with the or each body panel of the identified vehicle in the image data such that the or each colour sample location is likely to represent the colour of the body panel of the vehicle; and an output configured to issue a signal representative of the or each sample location.

In an embodiment, the system further comprises: a colour sample location learning module configured to identify at least one colour sample location within the image data using an expected colour for the colour sample; a processor configured to use the at least one colour sample location to obtain from the image data a colour sample of a part of a vehicle represented by the image data; and an output configured to issue a signal representative of the colour of the at least one colour sample.

In an embodiment, the system further comprises a pre-processor including the identifier module and a processor including the comparator, wherein the pre-processor and processor are remote from each other.

Another aspect of the present invention provides a computer implemented method for detecting the presence of at least part of a vehicle in image data, the method comprising: receiving image data; identifying a plurality of linear regions in an image represented by the image data; comparing at least one of the number, cumulative size, and density of the linear regions with a respective threshold value; and issuing a signal indicating the detection of a vehicle based on the results of the comparison.

Another aspect of the invention provides computer readable medium including program instructions which when executed by a computer cause the computer to perform the method.

Another described aspect provides an automatic number plate recognition system operable to receive image data including data relating to one or more number plates and process the image data to obtain one or more registration numbers associated with the one or more number plates, the system comprising: an image data pre-processor operable to receive image data and output pre-processed image data; and a main processor operable to receive the pre-processed image data from the image data pre-processor and output one or more registration numbers associated with the one or more number plates, wherein the pre-processed image data includes location information for one or more possible number plates within the image data, or isolated sections of the image data representing one or more possible number plates, or an indication concerning whether there are any possible number plates in the image data.

In a described aspect, the image data is included in the pre-processed image data.

A described aspect further comprises at least one camera operable to capture image data and output the image data to the image data pre-processor.

In a described aspect one or more of the cameras is an infra-red camera.

In a described aspect one or more of the cameras is a high-definition camera.

In a described aspect the image data pre-processor and main processor are located in the same casing.

In a described aspect an output of the main processor is a wireless output.

In a described aspect an output of the image data pre-processor is a wireless output.

In a described aspect the pre-processor is further configured to detect the presence of image data relating to at least part of a vehicle in the received image data by identifying linear regions in the received image data; comparing at least one of the number, cumulative size, and density of the linear regions with a respective threshold value; and issuing a signal indicating the detection of a vehicle based on the results of the comparison.

In a described aspect the pre-processor is further configured to detect movement of a vehicle at least partially represented in the received image data by identifying a linear region in the received image data; tracking the location of the identified linear region in further received image data; and issuing a signal indicating the detection of vehicle movement if the location of the identified linear region substantially changes location.

In a described aspect the pre-processor is further configured to determine a type of vehicle at least partially represented in the received image data by identifying linear regions in the received image data; comparing at least one of the cumulative size, number, and density of the identified linear regions with respective predetermined threshold values for each of one or more different types of vehicle; and issuing a signal representative of the type of vehicle detected in dependence on the comparison.

A described aspect further comprises an antenna configured to receive a signal from a radio communication system including a unique or substantially unique identifier associated with the radio communication system, wherein the system is configured to associate the received identifier with the or each registration number.

A described aspect further comprises a database in which information representative of the external appearance of one or more vehicles including the location of one or more body panels of the or each vehicle is stored, wherein the system is further configured to compare the at least part of the image data with the information stored in the database, determine the identity of a vehicle represented in the image data, and determine at least one colour sample locations in the image data associated with the or each body panel of the identified vehicle in the image data such that the colour sample locations are likely to represent the colour of the body panel of the vehicle.

Another described aspect provides a pre-processor for use in automatic number plate recognition system, the pre-processor comprising: an input operable to receive image data including data relating to one or more number plates, a processor to process the image data for data relating to possible number plates; and an output operable to output pre-processed image data, wherein the pre-processed image data includes location information for one or more possible number plates within the image data, or isolated sections of the image data representing one or more possible number plates, or an indication concerning whether or not there are any possible number plates in the image data.

In a described aspect the image data is included in the pre-processed image data.

In a described aspect the pre-processor is in the same casing as a main processor which is operable to process the pre-processed image data.

In a described aspect the output of the pre-processor is a wireless output.

In a described aspect the output of the pre-processor is a wired output.

In a described aspect the pre-processor is further operable to detect the presence of image data relating to at least part of a vehicle in the received image data by identifying linear regions in the received image data; comparing at least one of the number, cumulative size, and density of identified regions with a threshold value; and issuing a signal indicating the detection of a vehicle based on the results of the comparison.

In a described aspect the pre-processor is further operable to detect movement of a vehicle at least partially represented in the received image data by identifying linear regions in the received image data; tracking the location of the identified linear regions in further received image data; and issuing a signal indicating the detection of vehicle movement if the location of the identified linear regions substantially changes location.

In a described aspect the pre-processor is further operable to determine a type of vehicle at least partially represented in the received image data by identifying linear regions in the received image data; comparing one or more of the cumulative size or number of the identified linear regions with respective predetermined threshold values for each of one or more different types of vehicle; and issuing a signal representative of the type of vehicle detected in dependence on the comparison.

In a described aspect the pre-processor input is further operable to receive a signal from an antenna, wherein the signal is from a radio communication system including a unique or substantially unique identifier associated with the radio communication system and the pre-processor is operable to associate the or each received identifier with the pre-processed image data.

Another described aspect provides a method of processing image data in an automatic number plate recognition system to determine the registration numbers of one or more number plates in the image data, the method comprising: receiving image data including data relating to one or more number plates; pre-processing the image data for data relating to possible number plates and to output pre-processed image data including location information for one or more possible number plates within the image data, or isolated sections of the image data representing one or more possible number plates, or an indication concerning whether or not there are any possible number plates in the image data; communicating the pre-processed image data to a main processor; and processing the pre-processed image data in the main processor to determine the registration numbers of one or more number plates.

Another described aspect provides a vehicle movement detection system for detecting the movement of a vehicle in a sequence of images represented by image data, the system comprising: an interface configured to receive image data representing a first image in a sequence of images; an identifier configured to identify linear regions in the received image data; a tracking module configured to track the location of one or more of the identified linear regions in the received image data representing a second image in the sequence of images; and an output configured to issue a signal indicating the detection of vehicle movement if the location of the one or more linear regions substantially changes location.

A described aspect further comprises a camera configured to generate the image data.

A described aspect further comprises a partition module configured to partition the image data into sections and determine whether or not each section contains a linear region.

A described aspect further comprises an automatic number plate recognition system wherein the automatic number plate recognition system is coupled to the output and is adapted to be triggered by the signal indicating the movement of a vehicle.

A described aspect further comprises a boundary calculator configured to calculate a boundary of the identified linear regions and to compare the size of the boundary with at least one expected vehicle size to determine a type of detected vehicle.

A described aspect further comprises a tracking module configured to track a boundary of the identified linear regions.

Another described aspect provides a computer implemented method for detecting the movement of a vehicle in a sequence of images represented by image data, the method comprising: receiving image data representing a first image in a sequence of images; identifying linear regions in the received image data; tracking the location of one or more of the identified linear regions in the received image data representing a second image in the sequence of images; and issuing a signal indicating the detection of vehicle movement if the location of the one or more linear regions substantially changes location.

Another described aspect provides a vehicle type detection system for detecting the type of a vehicle which is at least partially represented by image data, the system comprising: an interface configured to receive image data; an identifier configured to identify linear regions in the received image data; a comparator configured to compare at least one of the cumulative size, number, and density of the identified linear regions with respective predetermined threshold values for each of one or more different types of vehicle; and an output configured to issue a signal representative of the type of vehicle detected in dependence on the comparison.

A described aspect further comprises a camera configured to generate the image data.

A described aspect further comprises a partition module configured to partition the image data into sections and determine whether or not each section contains a linear region.

A described aspect further comprises an automatic number plate recognition system wherein the automatic number plate recognition system is adapted to be triggered by the signal representative of the type of vehicle detected.

In a described aspect the comparator is configured to compare a boundary representing the cumulative size of the linear regions.

A described aspect further comprises a tracking module configured to track a boundary of the identified linear regions.

Another described aspect provides a computer implemented method for detecting the type of a vehicle which is at least partially represented by image data, the method comprising: identifying linear regions in received image data; comparing at least one of the cumulative size, number, and density of the identified linear regions with respective predetermined threshold values for each of one or more different types of vehicle; and issuing a signal representative of the type of vehicle detected in dependence on the comparison.

Another described aspect provides a tracking and identity association system comprising: an antenna configured to receive a signal from a radio communication system including a unique or substantially unique identifier associated with the radio communication system; an identity information source configured to determine information of potential relevance to the identity of a user of the radio communication system; and a database adapted to store information determined by the identity information source in association with the unique or substantially unique identifier received by the antenna.

In a described aspect the identity information source comprises at least one of an automatic number plate recognition system, a fingerprint recording device, a camera, a facial recognition system, and an iris recognition system.

In a described aspect the radio communication system has a range which is substantially equal to a range of the identity information source.

In a described aspect a signal from the radio communication system is discounted if the strength of the signal is such that the identity information is unlikely relevant to the user of the radio communication system.

In a described aspect the radio communication system has a typical range of less than 100 m.

In a described aspect the radio communication system has a typical range of less than 50 m.

In a described aspect the radio communication system has a typical range of less than 10 m.

In a described aspect the radio communication system has a typical range of less than 1 m.

A described aspect further comprises a correlation module configured to correlate the information stored in the database to identify patterns in the information.

In a described aspect the correlation module is configured to analyse information determined by the identity information source in relation to a first unique or substantially unique identifier and to collect the information which is common to a plurality of records for the first unique or substantially unique identifier.

In a described aspect the correlation module is configured to analyse information determined by the identity information source in relation to a first unique or substantially unique identifier and to compare the information with information collected in relation to a second unique or substantially unique identifier.

In a described aspect information of potential relevance to the identity of a user comprises a unique or substantially unique identifier forming part of a signal from another radio communication system.

Another described aspect provides a tracking and identity association method comprising: receiving at an antenna a signal from a radio communication system including a unique or substantially unique identifier associated with the radio communication system; determining information of potential relevance to the identity of a user of the radio communication system from an identity information source; and storing in a database information determined by the identity information source in association with the unique or substantially unique identifier received by the antenna.

Another described aspect provides a vehicle colour sample location identification system comprising: a database containing information representative of the external appearance of one or more vehicles including the location of one or more body panels of the or each vehicle; an interface configured to receive image data representing at least part of a vehicle; and a processor configured to compare at least part of the image data with information stored in the database to determine the identity of a vehicle represented in the image data, and determine one or more colour sample locations in the image data associated with the or each body panel of the identified vehicle in the image data such that the or each colour sample location is likely to represent the colour of the body panel of the vehicle; and an output configured to issue a signal representative of the or each sample location.

In a described aspect the database contains information representative of the external appearance including the location of a plurality of body panels of the or each vehicle, and the processor is further configured to determine one or more colour sample locations in the image data associated with each of the plurality of body panels.

A described aspect further comprises an automatic number plate recognition system to determine the number plate number of the a vehicle at least part of which is represented by the image data; a colour sampler configured to sample the colour represented by the image data at the or each colour sample location associated with a body panel; and a comparator configured to receive information regarding the expected colour of the body panel of the vehicle based on the number plate number and to compare the expected colour with the colour sampled by the colour sampler.

Another described aspect provides a computer implemented method for vehicle colour sample location identification, the method comprising: receiving image data representing at least part of a vehicle; and comparing at least part of the image data with information stored in a database, containing information representative of the external appearance of one or more vehicles including the location of one or more body panels of the or each vehicle, to determine the identity of a vehicle represented in the image data, determining one or more colour sample locations in the image data associated with the or each body panel of the identified vehicle in the image data such that the or each colour sample location is likely to represent the colour of the body panel of the vehicle; and issuing a signal representative of the or each sample location.

Another described aspect provides a vehicle colour sample system comprising: a colour sample location learning module configured to identify at least one colour sample location within received image data using an expected colour for the colour sample; an interface configured to receive image data representing at least part of a vehicle; and a processor configured to use the at least one colour sample location to obtain from the image data a colour sample of a part of the vehicle represented by the image data and output a signal representative of the colour of the colour sample.

Another described aspect provides a computer implemented method for vehicle colour sampling comprising: identifying at least one colour sample locations within received image data using an expected colour for the colour sample; an interface configured to receive image data representing at least part of a vehicle; and a processor configured to use the at least one colour sample location to obtain from the image data a colour sample of a part of the vehicle represented by the image data and output a signal representative of the colour of the colour sample.

BRIEF DESCRIPTION OF THE DRAWINGS

In order that the present invention may be understood more fully, examples thereof will be described with reference to the accompanying drawings in which:

FIG. 2 shows a standard number plate.

DETAILED DESCRIPTION OF THE INVENTION

Figure 1:
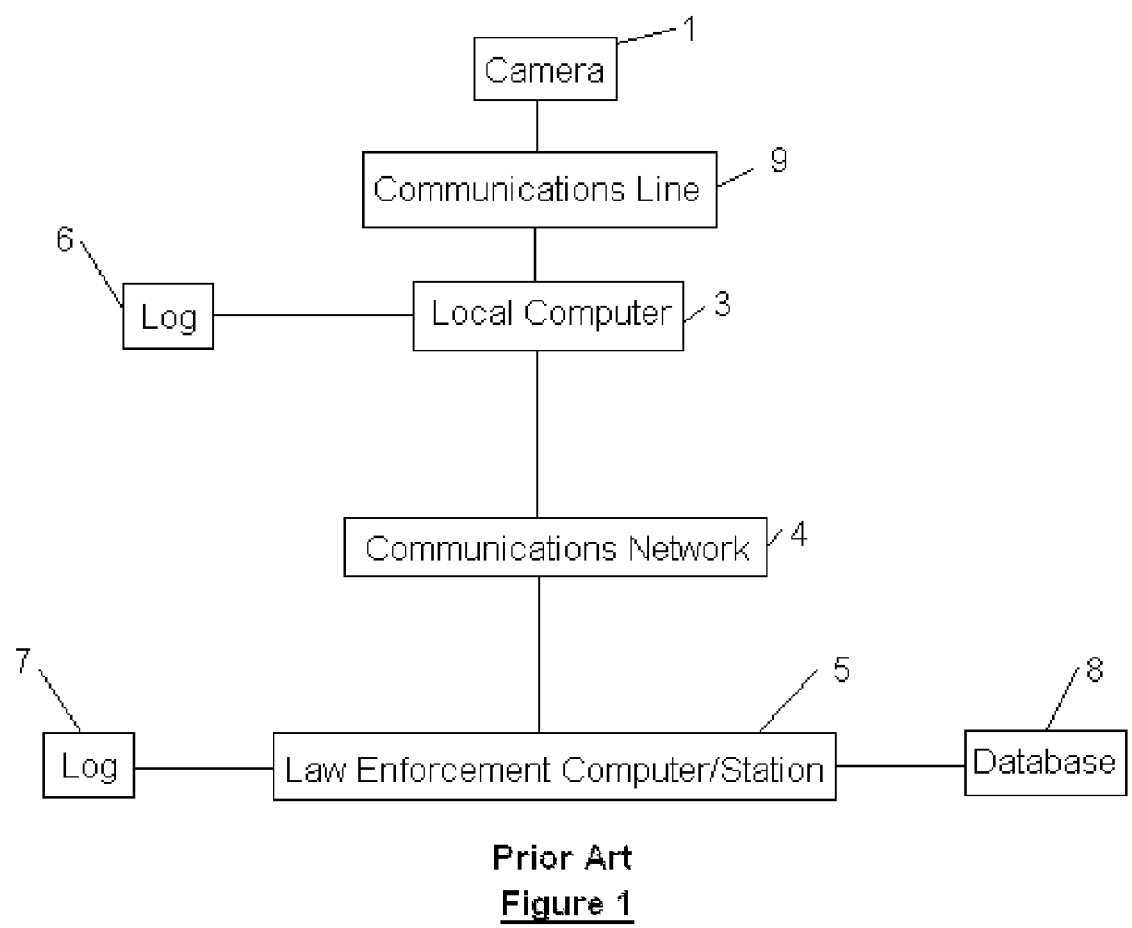
FIG. 1 shows a traditional ANPR system.
Figure 3:
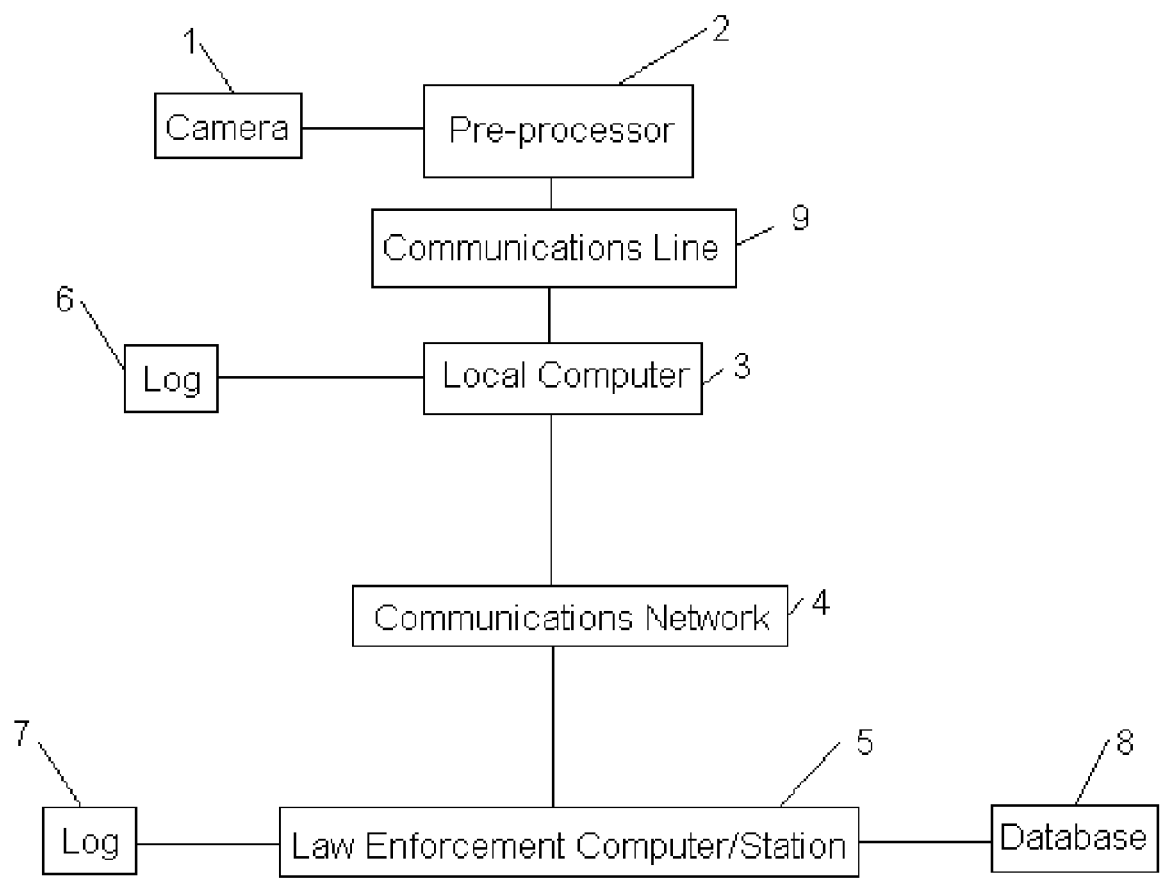
FIG. 3 shows an embodiment in accordance with the present invention.

Reference is made to FIG. 3. This figure depicts an automatic number plate recognition system in accordance with an embodiment of the present invention. In brief, the system comprises a camera 1 connected to a pre-processor 2 which is linked to a computer 3. A computer 3 is, in an embodiment, connected to a law enforcement station or computer 5 through a communications network 4. Storage logs 6, 7 are, in an embodiment, respectively connected to the computer 3 and the law enforcement station or computer 5. A database 8 is, in an embodiment, connected to the law enforcement station or computer 5 and contains, for example, registration numbers of interest.

The camera 1 may be an analogue or digital camera and may also be a high definition camera. As used herein, the term "high definition" is intended to make reference to current standards for high definition cameras and televisions. It is, however, envisaged that embodiments of the present invention will be capable of use with as of yet unforeseen digital image and high definition digital image formats. In general, the most significant difference to note between high definition and standard images is the number of pixels which define an image of a given site. In a high definition image there are considerably more pixels defining the same image area (i.e. there is a higher density of pixels). High definition images have a larger number of pixels than a standard definition image. Example standard definition image sizes (in pixels) may be 720×576, 704×576, 720×480, 720×486, or 704×480. Example high definition image sizes (in pixels) may be 1024× 768, 1280×720, 1366×768, 1920×1080, 1780×956, 1888× 1062, 1440×1080, or greater.

The pre-processor 2 is operable to receive image data from the camera 1; the image data represents information associated with pixels of an image captured by the camera 1. This information may be in digital or analogue format. The pre-processor 2 includes a processing unit which is operable to carry out pre-processing of the image data transmitted to the pre-processor 2 by the camera 1. The pre-processing includes but is not limited to identifying whether or not the image data contains the image of a number plate, identifying whether or not the image data contains an image of a number plate sufficient to allow for recognition, identifying the location of possible number plates within the image data, identifying and isolating images of number plates within image data, or any combination thereof.

The pre-processing can utilise a number of different techniques including the isolation of substantially rectangular areas within the image data, the isolation of substantially rectangular areas meeting certain parameters (e.g. size or colour), or the isolation of areas of the image data which meet certain parameters. The techniques may include the isolation of areas in the image data which are substantially the same shape as the expected number plate shape (which may not be rectangular if, for example, number plates in a particular location/jurisdiction are typically not rectangular or there are some number plates that are not rectangular).

The location of possible number plates may be represented by coordinates indicating at least one point within, or a known distance away from, a possible number plate. The location could, for example, be given as a pair of coordinate values representing the distances of the point from an origin of the image along two axes. The location of possible number plates may be represented by the co-ordinates (with respect to an origin) of first and second corners of each possible number plate—the first and second corners may be diagonally opposing corners (for example, the top left and bottom right corners, or the top right and bottom left corners). The location of possible number plates may be represented by the coordinates of at least one point within or a known distance away from each possible number plate along with an indicator representing the area in which the possible number has been detected relative to the or each point (the indicator may be a standard indicator that applies to all such coordinates or may be image specific).

The pre-processor 2 outputs pre-processed image data to the computer 3. The pre-processed image data comprises the results of the pre-processing. For example, the pre-processor 2 may output the image data along with a series of coordinates which identify the possible location of number plates within the image data. Alternatively, the pre-processor 2 may output pre-processed data in the form of sections of the original image data which the pre-processor 2 has identified as possible images of number plates.

The output from the pre-processor 2 is fed into an input of the computer 3 (through a communications line 9) which carries out the final processing steps in order to output a text string representing a number plate number identified from the original image data 1—this may include OCR processes and/or checks to confirm that a particular text string is likely to represent a number plate number (e.g. based on the number of characters and/or the arrangement of characters). It will be appreciated that the pre-processor 2 significantly reduces the amount of processing power required by the computer 3 in order to achieve the desired result (i.e. a text string representing an identified registration number). For example, if the pre-processor 2 only outputs pre-processed data representing images which may be number plates, then the computer 3 does not need to carry out an initial process to determine areas in the image data 2 which represent likely number plates. Instead, the computer 3 simply has to process the isolated pre-processed data to determine the registration number (or numbers) of any detected number plate contained in the original image data.

It will also be appreciated that the communications link 9 which connects the pre-processor to the computer 3 may, in accordance with embodiments of the present invention, communicate significantly less data than it would in a traditional system. For example, if the pre-processor 2 discards image data from the camera 1 which does not contain any likely number plates, then this image data need not be transmitted to the computer 3.

The computer 3 may be connected to a log 6 which is operable to store the results of the number plate recognition which is carried out by the computer 3. The computer 3 may be connected to a communications network 4 to allow communication between the computer 3 and a law enforcement station or computer 5. The law enforcement station or computer may be operable to receive a simple text string from the computer 3 or a text string and image data. The text string received by the law enforcement station or computer 5 may be the identified registration number, a time entry, a date entry, or other associated information (or any combination thereof). The image data transmitted by the computer 3 to the law enforcement station or computer 5 may be a reduced image data set. The reduced image data set may comprise, for example, the section of the original image data depicting the number plate or a section of the image data representing the number plate and one or more additional sections of the image data. Specifically, in some embodiments a system is provided in which the computer 3, upon receipt of pre-processed data from the pre-processor 2, carries out number plate recognition in respect of any identified number plates and isolates an area of the pre-processed image data surrounding the identified number plate. Thus, it may be possible to utilise the embodying system to capture, pre-process, process, and transmit to a law enforcement station or computer 5, image data containing not only the number plate of a vehicle but also data representing at least part of the vehicle.

Figure 6:
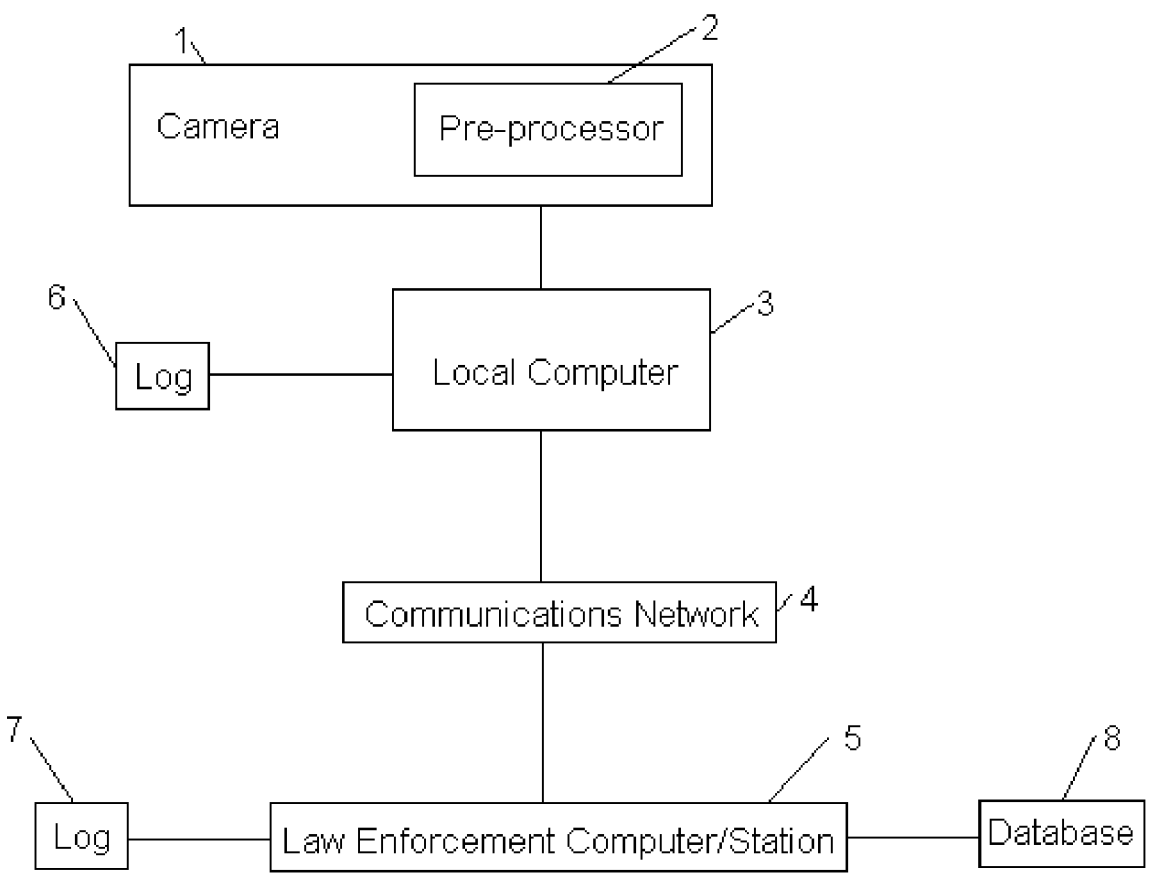
FIG. 6 shows an embodiment in accordance with the present invention.

In some embodiments the camera 1 is located in the same physical housing, casing, or container as the pre-processor 2 (see FIG. 6). This housing is located in a position such that the camera is operable to view passing vehicles including the number plates associated with the vehicles. In such an embodiment, the pre-processor 2 is connected to the computer 3 by either a wireless communications link (e.g. Bluetooth or WiFi) or a wired communications link (such as Ethernet or G-Ethernet). The computer 3 may be located in a station which is separate (i.e. remote) from the housing in which the camera 1 and the pre-processor 2 are contained.

Figure 5:
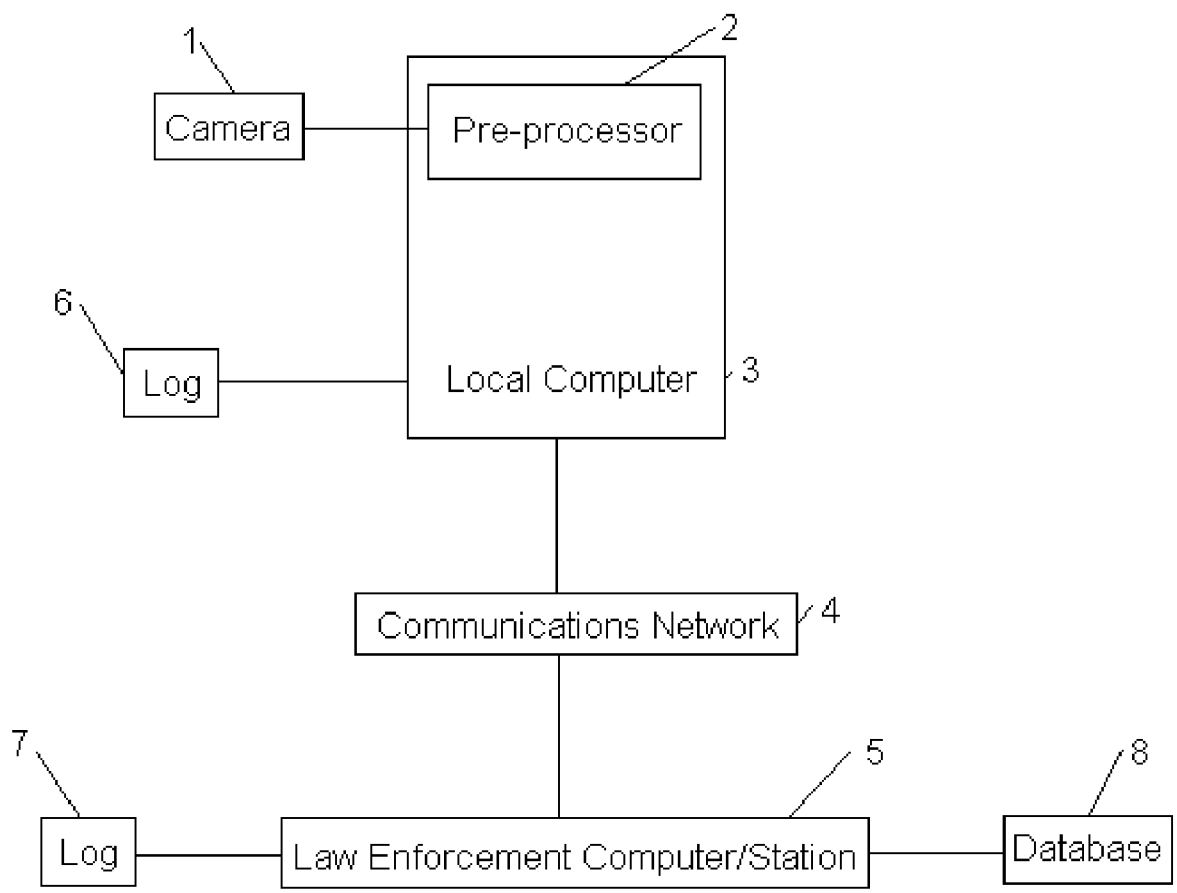
FIG. 5 shows an embodiment in accordance with the present invention.

In alternative embodiments (such as the embodiment depicted in FIG. 5), the pre-processor 2 is located within the same housing, case, or container as the computer 3. The camera 1 and the pre-processor 2 are linked either wirelessly (e.g. through Bluetooth or WiFi) or through a wired connection (e.g. Ethernet or G-Ethernet). In other words, in this embodiment, the pre-processor 2 is separate (i.e. remote) from the camera 1.

Figure 4:
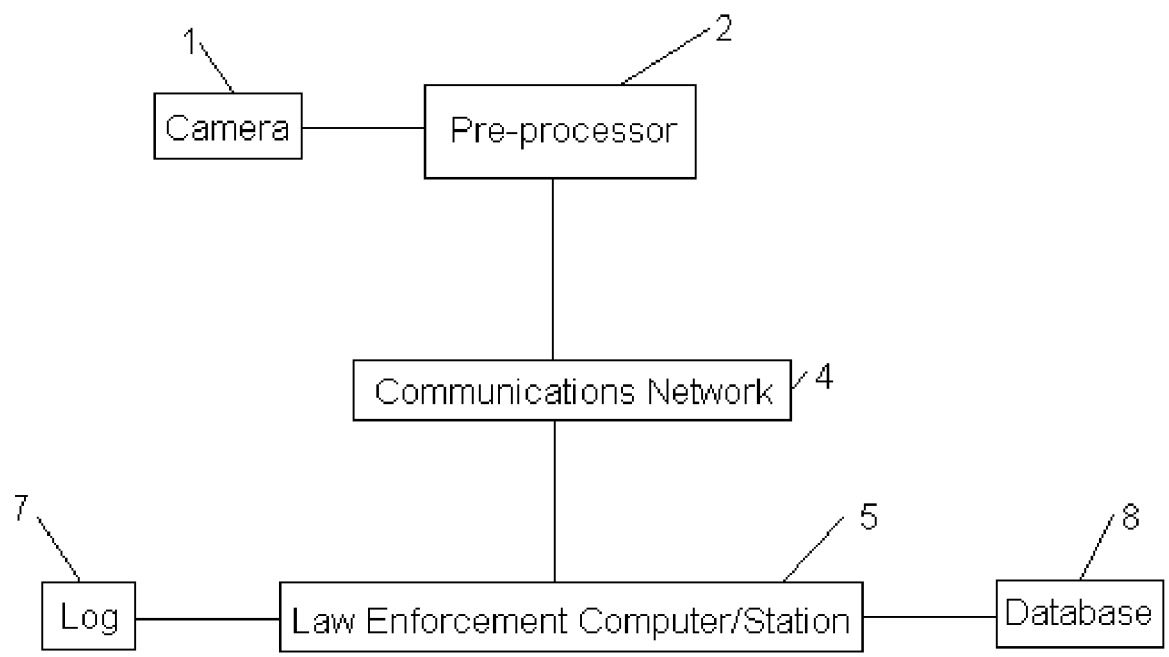
FIG. 4 shows an embodiment in accordance with the present invention.

In other embodiments, due to the significant reduction in the data which is transmitted by the pre-processor 2 (in the form of pre-processed data), it is possible to connect the pre-processor 2 directly to a communications network 4 which is, in turn, connected to a law enforcement station or computer 5. The law enforcement station or computer 5 will, in this embodiment, also carry out the recognition process that was previously carried out by the computer 3 in more traditional systems (see FIG. 4).

The communications network 4 may comprise a wired or wireless communications network. Examples of both wired and wireless communications networks have been given above and include Bluetooth, WiFi, GPRS, Ethernet, G-Ethernet, and optical fibre communications networks. In addition, the communications network 4 may also be achieved through the use of microwave signals. The use of other communication methods is also envisaged.

Some embodiments of the present invention comprise a pre-processor 2 including an input and an output communications channel. The input communications channel is operable to receive image data from a camera 1 and the output communications channel is operable to output pre-processed image data. The output from the pre-processor 2 is usually a digital output. However, the input to the pre-processor 2 may be either digital or analogue. The processes described above which are carried out by the pre-processor 2 can utilise either analogue or digital image processing techniques.

Preferably, the input and output communications channels of the pre-processor 2 are G-Ethernet communications channels and the pre-processor 2 includes one or more network control units operable to control the G-Ethernet output and input.

In some embodiments of the present invention (not depicted) the pre-processor 2 is associated with a digital video recorder (not shown). In such embodiments, the camera 1 is connected to the pre-processor 2 and the pre-processor 2 is connected to the digital video recorder. If the camera 1 is an analogue camera then the pre-processor may sample the analogue signal, carry out a digital conversion of the signal and process the information associated with the image (i.e. the image data). The pre-processor 2 may output (to the digital video recorder) a digital video signal produced as a result of the analogue to digital conversion or the pre-processor 2 may output the original analogue signal to the digital video recorder (which then performs the analogue to digital conversion). The pre-processor 2 is also operable to output processed image data (as discussed above) to the digital video recorder which may be operable to store this information along with a digital copy of the image data output by the camera 1; of course, similar operation is possible if the camera 1 is a digital camera which outputs a digital signal.

Embodiments of the present invention may use a variety of different cameras 1. Indeed, both digital and analogue cameras are envisaged for use with embodiments of the present invention. In some instances, the output from the camera 1 may be a digital output in the form of a G-Ethernet output or Ethernet output. The camera 1 may have an associated internet protocol (IP) address which allows other devices connected to the output of the camera 1 to communicate therewith (i.e. a so called "IP camera").

The pre-processor 2 according to some embodiments of the present invention comprises a central processing unit, memory (e.g. in the form of RAM, ROM, EPROM, magnetic storage, or optical storage or any combination thereof), at least one input, at least one output, a controller unit (to control the interaction of the parts of the pre-processor) and one or more buses (to connect the parts of the pre-processor). The form of the inputs and outputs is generally discussed above.

An embodiment of the present invention includes a camera 1 and pre-processor 2 which are coupled to a conventional ANPR system. For example, a camera 1 and pre-processor 2 generally as described above may be configured to identify the locations of one or more possible number plates in a series of images. The pre-processor may output an image of each possible number plate only or a series of images for each number plate only. This or these images may be passed to a conventional ANPR system which determines the registration number of the or each number plate. As will be appreciated, retrofitting an existing ANPR system with a camera 1 and pre-processor 2 may improve the accuracy of a conventional ANPR system which has comparatively poor number plate detection abilities. In addition, the pre-processor 2 may perform image enhancement methods (such as edge enhancement, colour adjustment, and the like) on the images before passing the pre-processed images to the convention ANPR system. Thus, the capabilities of an existing ANPR system can be improved by the addition of a camera 1 and pre-processor 2 generally as described without the need to replace the entire ANPR system. In such embodiments, the camera 1 and pre-processor 2 may be housed in the same housing.

Figure 7:
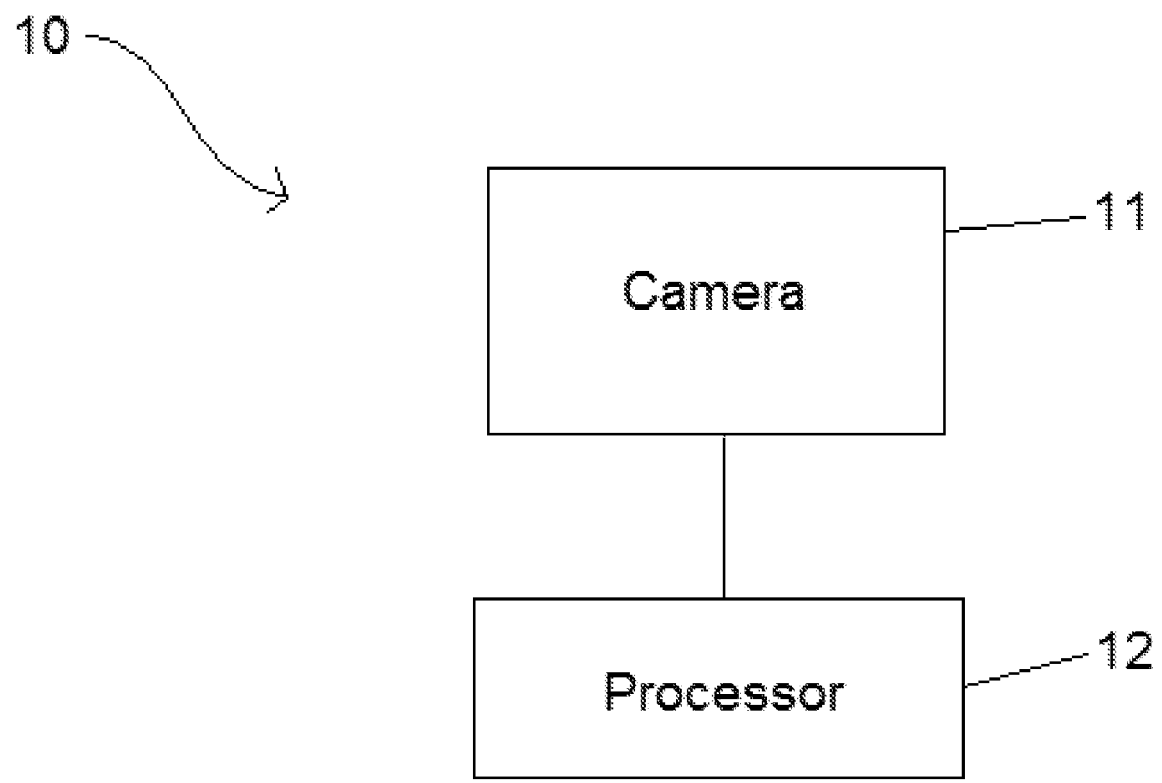
FIG. 7 shows an embodiment in accordance with the present invention.

With reference to FIG. 7, an embodiment comprises a system 10 for detecting the presence of a vehicle in a video sequence (comprising a sequence of images). The system 10 comprises a camera 11 and a processor 12. The camera 11 is configured to capture a sequence of images—these may be images of part of a road or site entrance (for example). The sequence of images is passed to the processor 12—the camera 11 may buffer the sequence of images and pass all or part of the sequence to the processor 12 in one block of data or may pass each image to the processor individually as they are captured or shortly thereafter (other suitable arrangements will be appreciated and are envisaged).

In operation, the camera 11 is located in a position such that it is expected that one or more vehicles will pass through its field of view. It will be appreciated that the camera 11 and processor 12 of the system 10 may be remote from each other or may be housed in the same housing. In an embodiment, the camera 11 may be camera 1 of the system described above and the processor 10 may be the pre-processor 2 as described above.

The system 10 is configured to perform a method which is similar to a method of detecting the location of a number plate within an image. In particular, the method of detecting the presence of a vehicle which the system 10 (and, in particular, the processor 12 of the system 10) employs comprises detecting linear regions in an image. A linear region may comprise a straight line between two parts of a vehicle such as the top of the windscreen or a straight line between two areas of the vehicle which are visually distinct (or otherwise distinguishable—for example distinct in the infra-red spectrum if the camera 11 is an infra-red camera). The linear regions may be substantially straight lines or lines which are approximated to straight or substantially straight lines. For example, a linear region with a degree of curvature which is less than a predetermined threshold may be approximately to a substantially straight line. In an embodiment, this predetermined threshold may be user adjustable. The predetermined threshold may also apply to other substantially linear regions.

The linear regions may form rectangular areas in the image but this need not be the case. The external appearance of a vehicle typically comprises a large number of linear regions (even modern vehicles with rounded and curved edges). Thus, as a vehicle approaches the system 10 and moves into the field of view of the camera 11 one or more linear regions will be detected in the images which are captured by the camera 11—typically a plurality of linear regions will be detected.

The processor 12 may be configured to track/identify the location, the number, the size, the cumulative size, and/or the density of any linear regions which have been detected in an image of a sequence of images or any combination of such tracking/identification methods. This information may be output by the processor 12 or may be used inside the processor 12 to trigger another event.

In an embodiment, the locations of the detected linear regions are not each individually tracked. Instead, the processor tracks the location of linear regions by tracking an average of the locations of the detected linear regions. This allows the system to compensate for linear regions which change, appear, or disappear between images in the sequence (for example, because the vehicle is moving relative to the camera 1). The average location may be calculated in a number of different manners. In an embodiment, the average location is a mean, median or modal average of the co-coordinates of the locations of the detected regions with respect to an origin. In an embodiment, movement of the vehicle is tracked by tracking the movement of one or more linear regions or a group of linear regions (the group may be a particularly dense group—for example) between images in a sequence of images.

In an embodiment, the processor 12 is configured to track/identify the number and/or size of linear regions which have been detected. The processor 12 may be configured to indicate that a vehicle has been detected only if the number and/or cumulative size and/or the density of the detected linear regions exceeds (or is below) a predetermined threshold. Typically, the number or cumulative size of detected linear regions in an image of a vehicle will be generally proportional to the size of the vehicle in the image (although variations will be inevitable due to the different appearances of different vehicles). Thus, the number and/size information may permit the processor 12 to determine a predicted vehicle size or general type (e.g. a car, a van, a lorry, etc) or simply that a vehicle is present. The density information may also be used to distinguish between different types of vehicle for example.

As will be appreciated, it may be that the system 10 is a motion, a vehicle, general vehicle type, or vehicle size detection system (or any combination thereof).

In an embodiment, the system is pre-configured to ignore certain detected linear regions in an image which may be, for example, common to all captured images from that camera 11 (for example, such regions may relate to an object which has a fixed relationship with the camera 11—such objects may be a building, sign-post, street light or the like).

Whereas a number plate detection system may ignore linear regions or rectangles of sizes which are unlikely to be part of vehicle number plates, the vehicle movement detection system 10 may be configured to detect a far greater diversity of linear regions. It may be that not all of these linear regions form rectangles or parts of rectangles (as may be the case in a number plate detection system).

As will be appreciated, the system 10 may be part of an ANPR system and the camera 11 and processor 12 may be the same camera and processor that are used in an ANPR system—the more specific example of the camera 11 being the camera 1 and the processor 12 being the pre-processor 2 of the above described embodiments has already been mentioned.

Thus, it will be understood that it may be possible to adapt an existing ANPR system to detect the presence, motion, size and/or general type of a vehicle in an image or a sequence of images captured by the system without substantive changes to the hardware which is used in the system. This information can be used to supplement the information obtained by the ANPR system or may be used to determine which image in a sequence of images should be used to detect the number plate of a vehicle and determine the registration number. If the presence of a vehicle is detected but no registration number determined than this may cause the system 10 to issue an error and alarm to draw this to the attention of an operator.

Embodiments of the system 10 seek to reduce the number of incorrectly detected vehicles which may occur using conventional motion detection systems and methods. For example, embodiments may discount detected objects which are too small to be a vehicle or which contain too few linear regions such that the object is unlikely to be a vehicle.

In an embodiment, an image (which may be a frame of a video or other image sequence or part of a frame) is split into a predetermined number of rows and columns. Thus, the image is partitioned into a grid of rectangles (or squares), which may cover the whole image or a targeted section. An edge detection process is applied to each rectangle to identify horizontal and/or vertical lines or linear regions which are indicative of the sharp edges of a vehicle (e.g. the vehicle bodywork).

The identified horizontal and/or vertical lines or linear regions which are identified are then analysed to determine the number of rectangles containing lines and/or the number of lines or linear regions in each rectangle and/or the location of the rectangles containing lines or linear regions with respect to each other. This information is then processed to determine whether or not a vehicle-like object is present by comparing the results to respective predetermined thresholds (which may be user adjustable). For example, a large number of rectangles containing identified lines or linear regions may imply the presence of a large object with linear regions in the image; a large number of lines or linear regions identified in a rectangle or group of rectangles may indicate an object with linear characteristics of a size corresponding to the size of the rectangle or group of rectangles; an isolated rectangle with a number of identified lines or linear regions may imply that the object is relatively small.

In an embodiment, the number of vertical and the number of horizontal lines or linear regions identified are independently analysed. In an embodiment, a priority is given to the identification of horizontal lines or linear regions over vertical lines, or vice versa. This information may be used to differentiate the front and rear of a vehicle (particularly a long vehicle such as a lorry) as it moves through the field of view of the camera 11. The rear of a vehicle may have fewer vertical lines or linear regions than the front of the vehicle (which has more bodywork detail visible). This may allow a reduction in the number of falsely detected vehicles or the occurrence of multiple detections for a single vehicle. This information may also be used, in an embodiment, to determine the approximate length of the vehicle—based on the length of time between detection of the front and rear of the vehicle and the speed of travel of a part of the vehicle through a sequence of images.

The rectangles containing lines or linear regions may, in an embodiment, be grouped in a bounding box. The bounding box may be square or rectangular or may be another shape (which may not be a uniform shape). The bounding box may be more generally described as a boundary. References made herein to a bounding box should be construed as references to a bounding box or a more general boundary. The size (i.e. one or more dimensions or the area) of this bounding box may be used to determine a category or general type for the vehicle (e.g. car, van, or lorry/coach). In other words, the size of the bounding box can be compared to the expected size of vehicles of various different vehicle categories/types within the image. This expected size may be an average vehicle size. In an embodiment, the expected size is calculated based on detected and confirmed vehicles within the field of view of the camera 11—for example, the system 10 may be part of an ANPR system and the detected number plate number could be used to determine the expected vehicle category; over a predetermined learning period, the system 10 may learn the expected average (which may be a mean, modal, or median value) bounding box for the or each category/type of vehicle. The predetermined learning period may be before a detection period (in which the vehicle category/type is determined based on the size of the bounding box alone—and perhaps compared to the expected vehicle size based on the number plate number for confirmation) or may be a continuous process.

Movement of the detected vehicle may be achieved by tracking movement of the bounding box between images in a sequence of images.

These processes may, in an embodiment, be performed by processor 12.

As discussed above, there is a desire to provide a system which is able to determine the colour of a vehicle.

Figure 8:
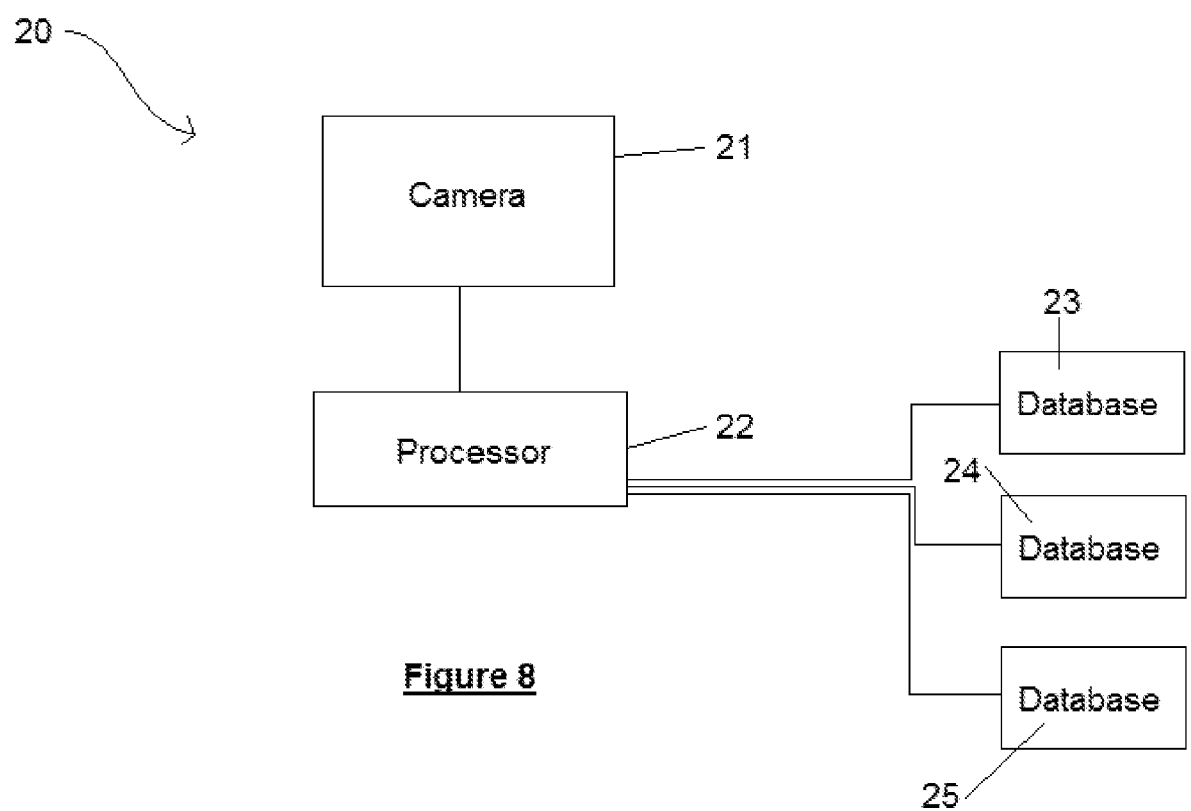
FIG. 8 shows an embodiment in accordance with the present invention.

Embodiments of the present invention seek to provide a system and method for determining the colour of a vehicle. Some such embodiments are described with reference to FIG. 8.

The system 20 comprises a camera 21 connected to a processor 22. The processor 22 is connected to a first database 23 and may be connected to a second database 24.

In use, the camera 20 may be located such that one or more vehicles are expected to pass through its field of view.

The first database 23 is a database of information which is representative of the external configuration and appearance of one or more vehicles. This information may comprise a three dimensional model or a two dimensional model of each of the one or more vehicles. If the information is in the form of one or more two dimensional vehicle models, then these models may represent respective vehicles as seen from the same angle as the angle at which it is expected that actual vehicles will approach the camera 21 (in use).

It may be that the models of the vehicles stored in the first database include information which is representative of the models of the vehicles—for example, the first database 23 may contain the results of a Fourier Transform operation of a two dimensional model of a vehicle. The first database 23 preferably includes information relating to a plurality of different vehicles but may contain information relating to a single vehicle of particular interest.

The second database 24 may be a list of vehicle colours and associated vehicle manufacturers and types/models. For example, the second database 24 may be a database of the vehicle colours which are used by each of one or more manufacturers and may contain a list of the vehicle colours in which a particular model/type of vehicle by that manufacturer where provided. It will be appreciated that the first 23 and second 24 databases may comprise a single database.

In operation, when the presence of a vehicle in the field of view of the camera 20 is detected, an image captured by the camera 21 is processed by the processor 22 to detect the edges of different parts of the vehicle. This information is then compared with the information in the first database 23 or information derived therefrom. For example, a Fourier Transform operation may be performed on the detected edges of the parts of the vehicle captured in the image by the camera 21.

This information may be correlated with the information in the first database 23. The results of the correlation may provide an indication as to the vehicle type/model or manufacturer or both of the detected vehicle captured in the image by the camera 21. It may be that several different manufacturers or types/models of vehicle are determined to be possible matches to the captured vehicle image.

The information in the first database 23—which is preferably in the form of two or three dimensional models—associated with the or each matching vehicle is used by the processor 22 to determine a location within the captured image which represents a part of the vehicle from which colour information can be extracted. For example, the processor 22 may select a door panel or bonnet area from which to sample the colour of the vehicle. Preferably, the processor 22 identifies a plurality of sample points or locations from which colour samples are to be obtained. The processor 22 may then average the sampled colour values to determine a colour of the vehicle. If multiple possible vehicle type/model and manufacturer matches have been identified, then the sample points may be determined based on one of the model for one of these vehicles or may be determined such that the sample points would be suitable for all or most of the matched models of vehicles stored in the first database 23.

It will be appreciated that some vehicles have different door panel colours to bonnet area colours—for example. Therefore, the processor 22 may determine a separate colour for the or each area of the vehicle from which colour samples are to be obtained—for example, one or more samples may be obtained from the bonnet area and averaged to determine a bonnet area colour and one or more samples may be obtained for a door panel and averaged to determine a door panel colour. Thus, a vehicle panel colour for one or more panels may be determined.

The second database 24 may be used to by the processor 22 to determine the colour of a sample.

In an embodiment, the second database 24 is used to match the determined colour or colours for a vehicle to a nearest known vehicle paint colour or colours. In an embodiment, the determined colour or colours may be compared with the colours of paint (stored in the second database 24) which are used by a specific manufacturer (the specific manufacturer may be the manufacturer determined by the processor 22 using the first database 23). The model/type of vehicle may also be used. Thus, the colour information may be used to verify the determined manufacturer and/or model/type of vehicle. The colour information may be used to choose between two different close matches identified during the correlation process described above. It will be appreciated that vehicles can be re-painted to a different colour to that provided by the manufacturer and that therefore this verification or selection based on colour may not be accurate in every instance. The system 20 preferably outputs a warning if a manufacturer, or vehicle type/model has been determined using colour information or if the colour information does not match the colour information stored in the second database 24 for the manufacturer or type/model of the vehicle.

The camera 21 and processor 22 of this system 20 may form part of an ANPR system. It will be appreciated that the camera 21 and processor 22 of the system 20 may be remote from each other.

It will be appreciated that this information (including the registration number) could be passed to a law enforcement computer (or the like) for comparison with other records accessible by the law enforcement computer for that vehicle.

The information determined by the system 20 may be gathered in a database 25. This database 25 may be indexed by registration number (for example) and may permit law enforcement agencies (and the like) to monitor the history of vehicles which are associated with a particular registration number. For example, a number plate (having a registration number) may be switched from a first vehicle to a different second vehicle which is a different model/type of vehicle. If the first vehicle was detected by the system 20, then a record of the vehicle model/type, manufacturer and colour may be stored in a database 25. If the second vehicle (with the same number plate) is detected by the system 20, then the model/type, vehicle manufacturer and colour may be compared to the information stored in the database 25. Discrepancies may be highlighted by a law enforcement computer performing the comparison for investigation. Alternatively, or in addition, the new details (for the second vehicle) may be appended to the details for the first vehicle already associated with that registration number in the database 25. Thus, a full chronological record of changes in details regarding the vehicle may be generated.

In an embodiment, the system 20 is part of an ANPR system. In this embodiment, a vehicle is detected and the camera 21 captures an image of the whole or a part of that vehicle; the captured image is output as image data. The ANPR system detects the number plate number of the vehicle. The number plate number of the vehicle is used by the system 20 to interrogate a database 25 which, in this embodiment, comprises at least one vehicle registration number associated with the vehicle type, model, and/or make, along with the expected vehicle colour. The system 20 is configured to learn (for example, through the use of a neural network) the location within the image data at which a colour sample can be obtained which most closely matches the expected colour of the vehicle. The learning process may take into account the time of day, the time of year, the angle of approach of the vehicle, and alterations in lighting due to, for example, the construction of a new building adjacent the field of view of the camera. The learning process may take into account the expected vehicle type, model and/or make based on a detected number plate number and the information in the database 25. Thus, different colour sample locations may be stored for each of at least one of vehicle type, model and make.

The learning process may occur during a learning period which is distinct from an operational period or the learning period may partially or completely overlap with an operational period. Different colour sample locations may be selected by the system 20 for different types of vehicle (or different makes and/or models of vehicle).

In an embodiment, the system 20 is not part of an ANPR system. In this embodiment, the learning process may be implemented using a vehicle of known colour. This colour is input into the system 20 and the system learns colour sample locations which are closest to the known colour from image data representing that vehicle in the field of view of the camera. Different colour sample locations may be selected for different times of day or year. In addition, the system 20 may be further operable to detect the type (and/or make and/or model) of vehicle and to use a one or more colour sample locations which are specific to that type (and/or make and/or model) of vehicle and different to the colour sample locations for a different type (and/or make and/or model) of vehicle.

The or each colour sample location may be determined by reference to an origin of the image data or, for example, by reference to a point at a predetermined position with respect to a detected number plate.

These processes may, in an embodiment, be performed by processor 22.

There is a desire to track the occupants of vehicles as well the vehicles themselves. This can be difficult because it is often difficult to identify single vehicle occupants from images captured by road-side cameras—for example.

The use of personal digital radio communication systems is increasing. Such systems are often of comparatively low range and are used, for example, to link a mobile telephone (a cell phone) to a headset (having a microphone and speaker), or to link a mobile telephone to an vehicle computer, or to link a navigation system to a vehicle computer. Examples of such systems include Bluetooth (Registered Trade Mark) systems and WiFi (Registered Trade Mark) systems. Such systems are often used to form local area networks and include a unique identifier or substantially unique identifier (such as a hardware address—for example a Media Access Control (MAC) address)

Devices which may have such systems include mobile telephones, navigation systems, portable computers, and vehicles.

Figure 9:
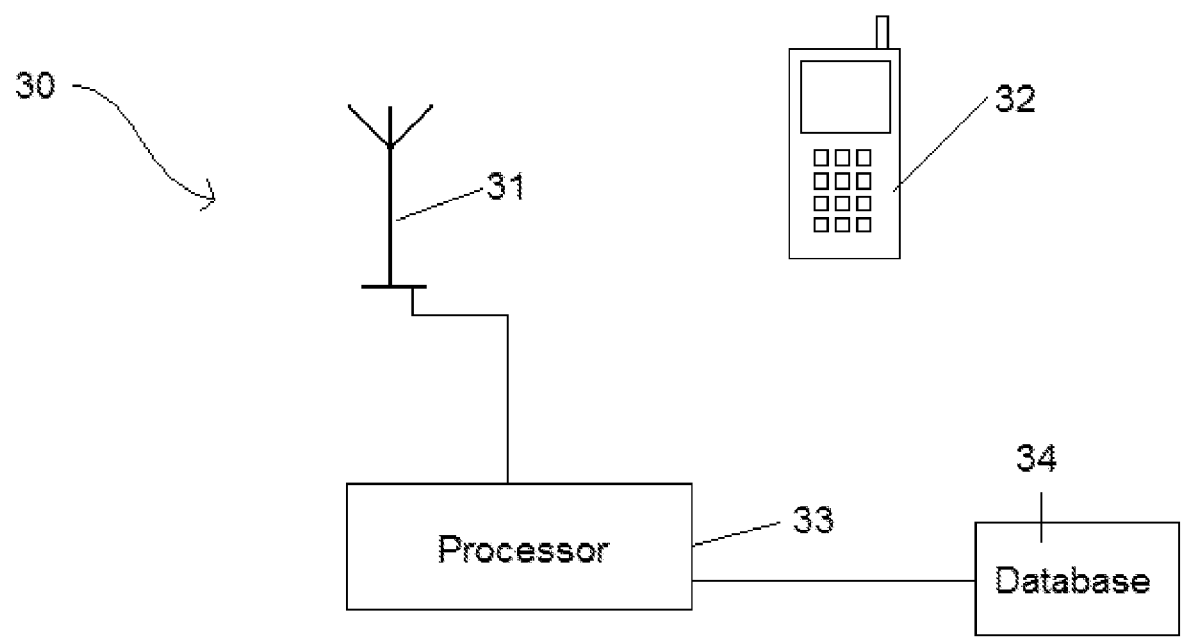
FIG. 9 shows an embodiment in accordance with the present invention.

A system 30 for gather information concerning personal digital radio communication systems is described with reference to FIG. 9.

The system 30 comprises an antenna 31 configured to receive signals from a device 32 capable of transmitting personal digital radio communication signals including a unique or a substantially unique identifier (hereinafter an identifier).

The system 30 may be adapted to ignore signals which are of over and/or under a particular signal strength threshold or thresholds—indicating, for example, that the transmitter of those signals is a long way away from the antenna 31. This may be achieved by the processor 32 or an element (not shown) of the antenna 31. The signal strength threshold(s) may be set to different levels depending on the type of signal. For example, the system 30 may be configured to ignore signals of a strength which indicates that the transmitter producing the signal is beyond the field of view of a camera associated with the system 30 (as will be described below).

The signals received by the antenna 31 are passed to a processor 33. The processor 33 is linked to a database 34. The database 34 may be remote from the processor 33 and linked to the processor by a communications line. The processor 33 is configured to extract the or each identifier from the received signals. The or each identifier is then stored in the database 34 along with a time and a date stamp. If the database 34 is to be used to store information associated with signals received by multiple antennae 31 which are each in a different geographic locations, then the database 34 may also store a location stamp with the identifier. It will be appreciated that a single database 34 may be associated with each antenna 31; in such an embodiment, if multiple antennae 31 are provided at various geographic locations, then the multiple databases 34 may be linked to a single master database (not shown) which stores a copy of each of the databases 34. Indeed, it may be that the databases 34 are local databases (with respect to their antennae 31) which act as buffers—the content of which is periodically uploaded to the master database and subsequently cleared from the local databases to provide additional free storage space for more entries in the databases 34.

If a record is available of the owners of the devices associated with each identifier then the database 34 provides a location of that person's device 32 at a given time on a given date (and hence a likely location of that person). This information can be used to track a device 32 (and the associated owner).

The system 30 may be associated with an ANPR system or other information gathering system (such as a face recognition system) such that the antenna 31 is located generally near or adjacent a camera of the ANPR or other information gathering system. Each registration number (or other information) determined by the ANPR system (or other information gathering system) may be associated with a corresponding set of detected identifiers which were received in the general location of the camera of the ANPR system (or other information gathering system). The system 30 may be configured to process only those signals which are likely to have been from a transmitter which is within the field of view of the camera. This information may be stored in a database which may be associated with the ANPR system (or other information gathering system). Alternatively, or in addition, each entry in the database 34 may include an associated registration number or registration numbers (or other information—such as a facial-print or prints).

A plurality of such systems 30 could be provided in a network. Each system 30 in the network may be associated with one or more information gathering systems (for example an ANPR system or a facial recognition system or a fingerprint reader or an iris reader or the like).

In the case of a system 30 associated with an ANPR system, by studying the information gathered using the system 30 it is possible to make some predictions and hypotheses about registration numbers which are associated with a particular device and vice versa.

For example, an arrangement may be provided to sort and process the information gathered by one or more of the systems 30 (i.e. correlate). The arrangement may identify patterns in the recorded information such as the presence of one particular identifier in the same location and at the same time as another identifier on a plurality of occasions. The arrangement may also detect patterns in the identifiers and associated additional information (such as vehicle registration numbers, facial-prints, finger prints, iris scans and the like).

To give a practical example, if a law enforcement agency takes a criminal into custody, the law enforcement agency may examine a device of that criminal which includes a personal digital radio communication system. They may determine an identifier of that system. The information collected by one or more systems 30 can be examined.

If the identifier of the criminal's device is one of a number of such identifiers which are recorded within a given time period in several different locations, then it may be that the devices associated with those identifiers are associated with each other (and hence that the owners of those devices are associated with each other). One identifier may be the identifier associated with the criminal's vehicle, another may be the identifier of a device belonging to a member of the criminal's family and another may be the identifier of a device belonging to another criminal who assisted the captured criminal in the crime being investigated.

The law enforcement agency can use the information gathered by the system 30 or systems 30 to locate the last recorded location of the criminal's vehicle (with respect to an antenna 31 of a system 30). A search for the vehicle can then be targeted around that location.

The law enforcement agency may identify the aforementioned family member and decide that the family member is not associated with the crime. Identification of the family member could be made by for example examining records which were gathered when that family member applied for a new passport and had a fingerprint taken. At the time the fingerprint was taken, the identifier associated with that family member may have been detected and stored in a database 34. The fingerprint of that family member may have also been detected at a later date as part of a bank security measure (for example) and again the same identifier may have been detected (indicating an association between the fingerprint—and hence the family member—and the identifier). This pattern of information may have been detected by the arrangement used by the law enforcement agency.

The law enforcement agency may also identify the aforementioned other criminal—for example, the law enforcement agency may note that the identifier associated with that criminal has been identified on a number of different occasions in association with a particular vehicle registration number and that this vehicle is registered in the name of this other criminal.

The law enforcement agency may investigate the information which the system or systems 30 have gathered concerning that criminal's identifier. It may be that that criminal's identifier is linked to several other criminals who were involved in the crime each of whom is associated with an identifier and each of which can be investigated and so on and so on.

Thus, the information which may be gathered by the system or systems 30 (along with any other associated information gathering systems) can be mined to make associations between individuals based on the devices which each individual uses.

Systems 30 may be provided in many different locations. Systems 30 may be located in positions at which other information is also available—be it an image from a camera, data from an application form (e.g. a visa or passport application form), or any other identity related information.

It will be appreciated that various combinations of the aforementioned embodiments, aspects and systems are possible and that each system has an associated method and that each part of each method may be performed by a module or system component. The or each module may be part of a unified system and may be a computer program or a part thereof embodied on a computer readable medium—which may be an optical or magnetic disk for example. Elements of the systems may be implemented in hardware or in software as will be apparent.

Embodiments and described aspects may form part of an entry system for a site—such as a military base, port, airport, car park or the like—or part of a more general security system.

It will also be appreciated, that the pre-processor 2 described above could be used as part of the other systems described herein.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

We claim:

1. A vehicle detection system for detecting the presence of at least part of a vehicle in image data, the system comprising:
an interface configured to receive image data;
an identifier module configured to identify a plurality of linear regions in an image represented by the image data;
a comparator configured to compare at least one of the number, cumulative size, and density of the linear regions with a respective threshold value; and
an output configured to issue a signal indicating the detection of a vehicle based on the results of the comparison.

2. The system according to claim 1, further comprising a camera configured to generate the image data.

3. The system according to claim 1, further comprising a partition module configured to partition the image data into sections and determine whether each section contains a linear region.

4. The system according to claim 1, further comprising an analysis module configured to analyse, independently, identified vertical linear regions and horizontal linear regions.

5. The system according to claim 4, wherein the analysis module is further configured to locate, based on at least one of the number, cumulative size and density of identified vertical and horizontal linear regions, at least one of the front and back of a vehicle.

6. The system according to claim 1, further comprising an automatic number plate recognition system wherein the automatic number plate recognition system is coupled to the output and adapted to be triggered by the signal indicating the detection of a vehicle.

7. The system according to claim 1, wherein the comparator is further configured to compare at least one of the cumulative size, number, and density of the identified linear regions with respective predetermined threshold values for each of one or more different types of vehicle; and the output is further configured to issue a signal representative of the type of vehicle detected in dependence on the comparison.

8. The system according to claim 1, further comprising a tracking module configured to track the movement of at least one of the identified linear regions in a sequence of image data such that movement of the detected vehicle is tracked.

9. The system according to claim 1, further comprising:
an antenna configured to receive a signal from a radio communication system including a unique or substantially unique identifier associated with the radio communication system;
an identity information source configured to determine information of potential relevance to the identity of a user of the radio communication system; and
a database adapted to store information determined by the identity information source in association with the unique or substantially unique identifier received by the antenna.

10. The system according to claim 9, further comprising a correlation module configured to correlate the information stored in the database to identify patterns in the information.

11. The system according to claim 10, wherein the correlation module is configured to analyse information determined by the identity information source in relation to a first unique or substantially unique identifier and to collect the information which is common to a plurality of records for the first unique or substantially unique identifier.

12. The system according to claim 10, wherein the correlation module is configured to analyse information determined by the identity information source in relation to a first unique or substantially unique identifier and to compare the information with information collected in relation to a second unique or substantially unique identifier.

13. The system according to claim 9, wherein information of potential relevance to the identity of a user comprises a unique or substantially unique identifier forming part of a signal from another radio communication system.

14. The system according to claim 1, further comprising:
a database containing information representative of the external appearance of one or more vehicles including the location of one or more body panels of the or each vehicle;
a processor configured to compare at least part of the image data with information stored in the database to determine the identity of a vehicle represented in the image data, and determine one or more colour sample locations in the image data associated with the or each body panel of the identified vehicle in the image data such that the or each colour sample location is likely to represent the colour of the body panel of the vehicle; and
an output configured to issue a signal representative of the or each sample location.

15. The system according to claim 1, further comprising:
a colour sample location learning module configured to identify at least one colour sample location within the image data using an expected colour for the colour sample;
a processor configured to use the at least one colour sample location to obtain from the image data a colour sample of a part of a vehicle represented by the image data; and
an output configured to issue a signal representative of the colour of the at least one colour sample.

16. A computer implemented method for detecting the presence of at least part of a vehicle in image data, the method comprising:
receiving image data;
identifying a plurality of linear regions in an image represented by the image data;
comparing at least one of the number, cumulative size, and density of the linear regions with a respective threshold value; and
issuing a signal indicating the detection of a vehicle based on the results of the comparison.

17. A computer readable medium including program instructions which when executed by a computer cause the computer to perform the method of claim 16.

* * * * *